United States Patent

[11] 3,619,444

| [72] | Inventor | John K. Roth |
| | | Simsbury, Conn. |
| [21] | Appl. No. | 786,262 |
| [22] | Filed | Dec. 23, 1968 |
| [45] | Patented | Nov. 9, 1971 |
| [73] | Assignee | Monsanto Company |
| | | St. Louis, Mo. |

[54] FORMING A THICKENED SECTION ON A CONTAINER FLANGE
1 Claim, 6 Drawing Figs.

[52] U.S. Cl.................................................. 264/89,
18/19 F, 264/92, 264/93, 264/160, 264/230, 264/289
[51] Int. Cl............................................... B29c 17/04,
B29c 17/14, B29c 23/00
[50] Field of Search............................................ 264/89, 92,
93, 154, 160, 230, 289; 18/19

[56] References Cited
UNITED STATES PATENTS

| 2,702,411 | 2/1955 | Winstead | 264/92 X |
| 3,082,482 | 3/1963 | Gaunt | 264/92 |
| 3,092,439 | 6/1963 | Harrison | 264/154 |
| 3,321,562 | 5/1967 | Wanderer | 264/92 X |
| 3,381,076 | 4/1968 | Govatsos | 264/160 X |
| 3,115,677 | 12/1963 | Thiel | 264/92 |
| 3,277,224 | 10/1966 | Whiteford | 264/289 X |

*Primary Examiner*—Robert F. White
*Assistant Examiner*—J. H. Silbaugh
*Attorneys*—James C. Logomasini and Michael J. Murphy ABSTRACT: A method for forming a thickened outer section on a flange of a biaxially oriented thermoplastic container. A generally continuous polystyrene sheet is stretched in two directions and successive portions of the sheet are forced against a heating platen so as to heat the portions while preventing any relaxation of the stresses induced by the stretching. Plural numbers of the flanged containers are then formed from each successive sheet portion by fluid pressure and are cooled. The cooled containers are then conveyed to a trimming station where a heated cutting element is used to sever each container from the sheet, the heating and cutting causing the peripheral edge of each severed container to form a bead due to relief of the induced stresses.

INVENTOR.
JOHN K. ROTH
BY
ATTORNEY.

INVENTOR.
JOHN K. ROTH

BY Michael J. Murphy
ATTORNEY:

FORMING A THICKENED SECTION ON A CONTAINER FLANGE

Accordingly it is an object of the present invention to provide an improved method for forming articles from thermoplastic sheet material.

It is an additional object of this invention to provide a method for thermoforming a container without forming jagged edges thereon.

It is a further object of this invention to provide a method for forming a thickened peripheral section on a container after the container forming step.

Another object of this invention is to provide a method for forming a thickened edge portion on a container made of biaxially oriented synthetic plastic.

Other objects of this invention will in part be obvious and will in part appear hereinafter.

These and other objects are accomplished by providing a method of forming a thermoplastic container having a laterally extending flange with a thickened outer section, the method comprising the steps of biaxially orienting a sheet of thermoplastic material; trapping a portion of the oriented sheet to confine said portion from which the container will be formed; heating the trapped sheet portion to molding temperature; forcing the heated and trapped sheet portion into a mold to form the container having a laterally extending flange; the container being attached to the sheet at the periphery of the flange; cooling the container to set the thermoplastic thereof; freeing the oriented sheet portion from confinement; and selectively heating a peripheral portion of the flange of the cooled container above the deorienting temperature of the biaxially oriented thermoplastic, while separating the container from the freed sheet, whereby the heated peripheral portion of the flange of the separated container is stress relieved and shrinks inwardly to form the thickened outer section of the flange.

The apparatus for carrying out this method includes heated severing means downstream of the forming mold for simultaneously selectively heating a peripheral portion of the flange of the container above the deorienting temperature of the biaxially oriented thermoplastic and for separating the container from the sheet along the periphery of the flange. The heated severing means preferably comprises a movably mounted knife, a supporting surface against which the knife moves while separating the container from the sheet and means in contact with the knife for increasing its temperature above the deorienting temperature of the thermoplastic.

In describing the overall invention reference will be made to the accompanying drawings in which.

Figure 1:
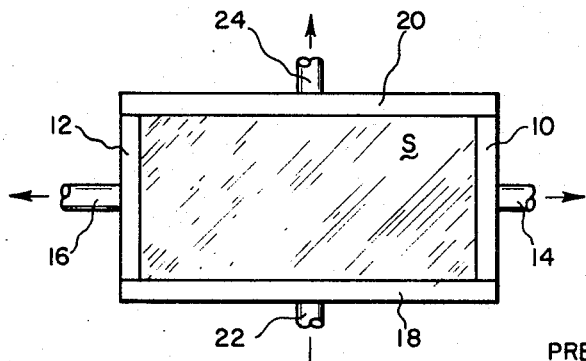
FIG. 1 is a schematic, plan view of a portion of the apparatus of the present invention illustrating the initial step in the present process of biaxially orienting a thermoplastic sheet.

With reference to the drawings, wherein identical numerals refer to identical parts, there is shown in FIG. 1, means for biaxially orienting a sheet S, for example, of polystyrene thermoplastic. In FIG. 1, sheet S has its marginal portions which are perpendicular to its longitudinal axis secured between opposing clamps 10 and 12, each of which is connected to shafts 14 and 16 respectively. Clamps 18 and 20 are secured along the marginal portions of sheet S which are parallel to its axis, with clamps 18 and 20 being attached respectively to shafts 22 and 24. Each of shafts 12 and 14 are connected to suitable conventional drive means (not shown) which, when activated, pull sheet S in opposite directions to orient it in a direction parallel to its axis. Shafts 22 and 24 are then similarly activated in opposite directions to elongate sheet S and orient it in a direction perpendicular to its axis. Sheet S when treated in this manner is stretched about 50 to 300 percent of its original length along its two principle axes so as to greatly increase its strength at a rather low cost per pound of material.

Figure 2:
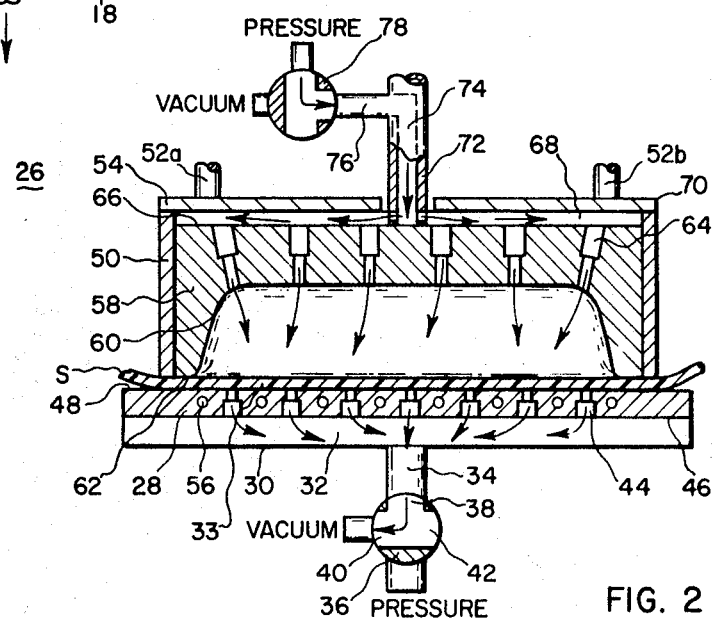
FIGS. 2 and 3 are schematic, elevational views of the heating and forming portions of the apparatus of the invention illustrating succeeding positions of the apparatus components during cycling thereof.
Figure 3:
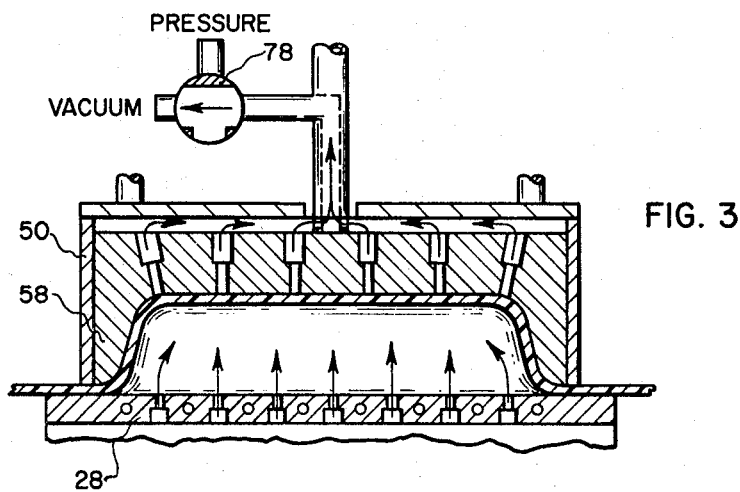

In FIGS. 2 and 3 is shown a thermoforming apparatus generally indicated as 26. Apparatus 26 includes means for trapping and heating a previously oriented sheet to confine and heat a portion thereof from which the container will be formed without destroying the orientation. The trapping means comprises platen 28 attached to housing 30 which forms plenum chamber 32. Housing 30 has an opening therein connected to conduit 34. Valve 36 is mounted in conduit 34 and has three ports 38, 40 and 42. Valve 36 is operable either by manual or automatic means and has ports arranged for connection through suitable conduits to either a subatmospheric vacuum source or a pressurized air source, while another of its ports is connected with chamber 32 through conduit 34, generally as shown in FIG. 2. Platen 28 has a multitude of channels typically illustrated at 44, formed therein between its lower face 46 which forms the base of chamber 32 and its upper surface 48. These channels are extremely small in diameter i.e. in the order of 0.020 in. at the points where they open into upper face 48 and may be incrementally larger at their other end to facilitate their forming.

As a further portion of the sheet trapping means of thermoforming apparatus 26, clamping member 50 is provided which is movably mounted by means of drive shafts 52a and 52b connected to clamping member 50 by means of support plate 54.

Means are provided as a portion of apparatus 26 for heating sheet S to molding temperature which includes resistance heaters typically depicted as 56 which are embedded in platen 28 and connected to a suitable source of electric power (not shown).

A mold 58 is provided having surface 60 conforming to the configuration of the body of a container such as a shallow tray, and upper face 62 which conforms in shape to a flange extending around the periphery of the container body at its upper end. The article defining surfaces 60 and 62 are maintained in an unheated state, i.e. at low or ambient temperature in comparison with that of platen 28 when heaters 56 are energized.

Mold 58 has formed therein multiple gas conveying channels 64 sized similarly to those in platen 28 and extending between the container body defining surface 60 and the upper face 66 of the mold. A plenum chamber 68 formed by housing 70 is on the upper side of mold 58 in a manner similar to that of platen 28. Housing 70 has an opening in which is mounted shaft 72 having bore 74 formed therein. Bore 74 opens into a flexible conduit 76 in which is mounted three-way valve 78 constructed similarly to that in conduit 34, and likewise communicating with a low pressure vacuum source and a pressurized air source as indicated in FIG. 2.

Figure 4:
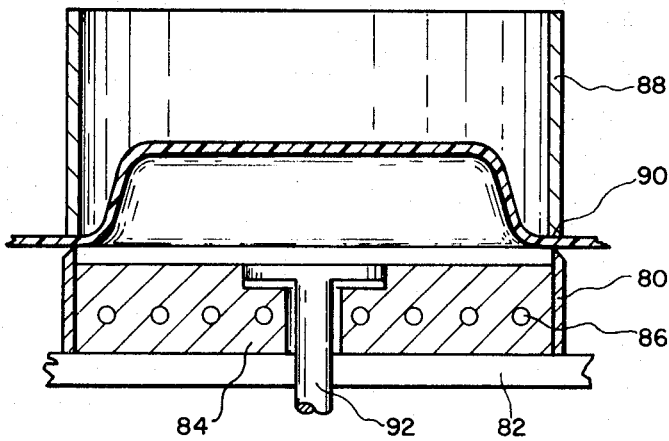
FIGS. 4 and 5 are views similar to FIGS. 2 and 3 illustrating the next succeeding steps in the process which include separating the container and forming the thickened outer portion thereof.
Figure 5:
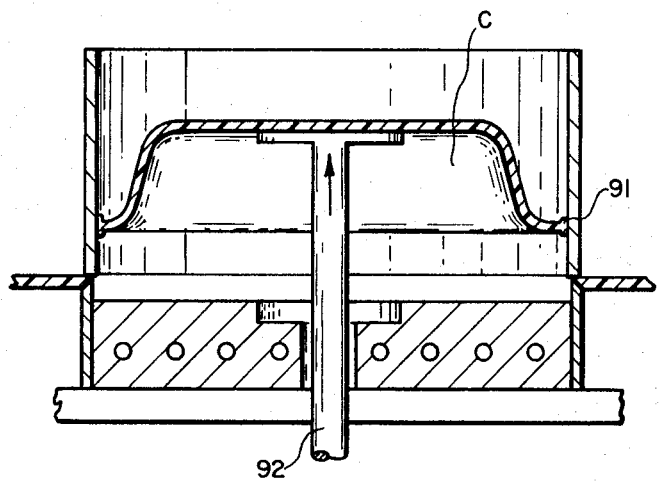

In FIG. 4 is shown an additional portion of the apparatus of the present invention which comprises heated severing means situated downstream of the apparatus of FIGS. 2 and 3 for simultaneously selectively heating a peripheral portion of the flange of the formed container above the deorienting temperature of the biaxially oriented thermoplastic and for separating the container from the sheet. These severing means include knife 80 which is reciprocatably mounted by means of base 82 being connected to a suitable drive shaft and actuating means not shown. Knife 80 is formed from a metal band, the periphery of which conforms to the outer periphery of the container flange. Block 84 is mounted within and in contact with knife 80. Block 84 has electric resistance heaters 86 embedded therein which are connected to a suitable source of electric power (not shown). Block 84 when heaters 86 are energized serves to conductively increase the temperature of knife 80. Cutting die 88 is provided having surface 90 against which knife 80 comes into contact during cycling of the apparatus. Piston 92 may be provided to aid in ejecting the container from die 88, and may be movably positioned by conventional means on the central axis of knife 80 as depicted in FIGS. 4 and 5.

In operation, a thermoplastic sheet S, for example of high impact polystyrene, is initially biaxially oriented by suitable means such as that depicted in FIG. 1. It is then conveyed by conventional means such as a conveyor into position between platen 28 and the oppositely positioned mold assembly. Valve 36 at this point is oriented in the position depicted in FIG. 2, so as to establish a negative pressure at upper surface 48 of platen 28 through channels 44, chamber 32 and conduit 34. This negative pressure draws sheet S against surface 48 of platen 28 and thus substantially eliminates the presence of air between sheet S and surface 48 of platen 28. Shortly thereafter or simultaneous with exposure of sheet S to vacuum, clamping member 50 is caused to reciprocate downwardly so as to apply its leading clamping surface against sheet S, thereby confining a central portion 33 of sheet S from which the container will be formed. As a further aid in assuring intimate contact of central portion 33 with platen 28, pressurized gas such as air at a pressure of between about 40–60 p.s.i.g. may be introduced against the opposite upper side of sheet portion 33 by means of three-way valve 78 which establishes communication between the sheet surface and the pressurized gas source through bore 74, chamber 68 and channels 64. The air issuing from the mold assembly in contacting the portion 33 of sheet S is prevented from escaping by clamping member 50 which presses against the sheet around the periphery of the central portion 33.

As is apparent from FIGS. 2 and 3, portion 33 of sheet S is trapped in place against platen 28 by means of the combined action of subatmospheric pressure acting on one side facing the platen, the super atmospheric pressure bearing on its other side facing the mold assembly and the clamping member 50 mechanically forcing a peripheral portion thereof against platen 28 and forming an air tight seal therewith. The combination of the force of the pressurized air applying the sheet against the platen and the frictional force between the faces of the platen and the sheet is greater than the stress force induced in the thermoplastic during orientation, thus avoiding deorienting the sheet during the trapping and heating portions of the forming cycle.

Sheet S is held in contact with platen 28 in the above described manner until it reaches molding temperature. This is usually a matter of ½ to 5 seconds for polystyrene sheet thicknesses between about 5 to 30 mils. Platen 28 is maintained at an elevated temperature by electric heaters 56, and is usually at a temperature in excess of that necessary to adequately soften the sheet for forming purposes in order to keep the cycle time at a minimum. Sheet S does not become deoriented during this heating step because of the confinement provided by the previously described trapping means.

After the central portion 33 of sheets S has been brought up to molding temperature, mold 58 is caused to reciprocate downwardly to the position depicted in FIG. 2. Three-way valves 36 and 78 are then actuated to change their port positions and introduce pressurized gas against the side of sheet S in contact with platen 28 and to expose the side of the sheet facing the mold to subatmospheric pressure generally as depicted in FIG. 3. This causes central portion 33 of the heated and trapped sheet to be forced into the mold to form the container having a laterally extending peripheral flange at its upper end. The container at this stage of the process is attached at the periphery of its flange to sheet S.

Mold 58 is unheated, i.e. is at ambient temperature or below, so that the heat plastified sheet which has been drawn into the mold is rather rapidly cooled to set the thermoplastic of the container, while clamping member 50 remains in the position illustrated in FIG. 3 and while the formed container remains attached to the residual web portion of sheet S. After the thermoplastic has been set, clamping member 50 and mold 58 are caused to reciprocate upwardly to free the oriented thermoplastic from the previously imposed confinement. Three-way valve 78 may optionally be again repositioned so as to introduce pressurized gas between the container and the surface of the forming mold to aid in ejecting the container from the mold.

Figure 6:
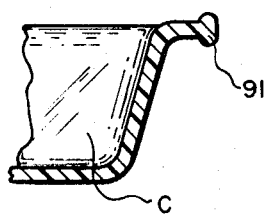
FIG. 6 is an enlarged, partial, sectional view of the thickened outer section of the container formed by the method and apparatus of FIGS. 1-5.

Sheet S with the formed and set container still attached thereto is then conveyed to the downstream trimming station depicted in FIGS. 4 and 5. Knife 80 has been previously brought to elevated temperature by means of contact with heated block 84. Knife 80 and block 84 are caused to reciprocate upwardly so as to bring the hot knife into contact with the peripheral portion of the flange of the formed container after the container has been indexed within die 88. The combination of the force applied by the knife and the temperature thereof, which in the case of oriented polystyrene is in excess of 190° F., results in the container being severed from the remainder of sheet S around the periphery of the formed container. Since the thermoplastic at this stage in the process is unconfined and free to move, and since the knife is above the deorienting temperature of the polystyrene, the heated and cut peripheral portion of the flange is stress relieved and shrinks inwardly to form a thickened outer section or bead on the container flange. This stress relieved, selectively chosen outer portion of the container flange has a smooth, rounded surface as generally depicted in FIG. 6. Undesirable slivers and jagged edges on the container flange are thus eliminated. Knife 80 is preferably initially maintained in contact with the peripheral portion of the container for a short period of time prior to final forcing of the edge through the plastic in order to permit adequate relieving of the orientation stresses to form the thickened outer section. However, excess contact time should be avoided, since this will result in undesirably relieving the orientation stresses in the inner portion of the container flange, thus rendering it brittle and destroying strength and toughness in the area of the container close to the upper end of its sides where strength is desirable. When knife 80 is at a temperature of about 300°–350° F. and sheet S is oriented polystyrene, acceptable results are obtained with a contact time of the knife with the sheet of from about ½ to 5 seconds. Obviously, knife temperatures and contact time are related with longer contact times necessary at lower knife temperatures. The knife temperature, however, must always be above the deorienting temperature of the thermoplastic sheet. Results in terms of sharpness of contour of the flange bead were improved when a dwell time of the hot knife surface in contact with the plastic was maintained prior to complete severing as opposed to contact after severing.

After the thickened outer section has been formed on the container and the latter cut from sheet S, piston 92 may be caused to reciprocate upwardly to force the container out of die 88 into a suitable collecting means, generally in the manner depicted in FIG. 5.

The above description and particularly the drawings are set forth for purposes of illustration only and are not to be taken in a limited sense.

In general the present invention provides a post trim thermoforming process wherein substantial stresses initially imposed in a thermoplastic sheet upstream of the forming station are selectively relieved in the peripheral portion of the flange of a container to provide a thickened outer section thereon. Stress relieving is accomplished by heated severing means brought into contact with the previously set thermoplastic of the formed container. The severing means may take a variety of forms, i.e. a rule die having a sharp edge on its leading end, a flat shearing surface adapted to move beyond an adjacent fixed surface with the plastic to be severed being positioned between the two. The severing means may be reciprocally or rotary mounted.

The position of the components with respect to the sheet may be reversed from that shown in the drawings, i.e. the heating platen and its attachments may be above the sheet and the mold with its attachments below the sheet. Positioning of the platen below the sheet is preferred since gravity assists in providing intimate contact of the sheet with the platen with this arrangement of the apparatus.

Obviously the invention is applicable to high speed, mass production molding operations where a plurality of articles are repeatedly simultaneously formed from a generally continuous thermoplastic sheet.

The clamping member of the present invention may optionally be an integral part of the upper end of the forming mold. In any event, this member should have a flat leading surface for establishing an airtight seal between the mold and the portion of the sheet which will form the container. The clamping member must not be heated since this would cause melting of the sheet, separation of the confined portion which is to form the container, loss of the seal and premature undesirable stress relieving prior to formation of the article.

The sheet material from which the article is formed may be of any orientable thermoplastic material which can be molded to produce an article of the type described. Suitable resins which may be used are polystyrene, styrene-acrylonitrile, acrylonitrile-butadiene-styrene, polypropylene, polyethylene, polycarbonate, polyacrylate, polymethacrylate, polyvinyl chloride, polyterephthalate, polyamide, polyesters and the like including copolymers and interpolymers thereof. Preferred polymers with which particularly good results have been obtained are polystyrene and polymers containing at least 30 percent by weight of polymerized styrene monomer with the remaining materials being thermoplastic polymers blended or interpolymerized with the styrene polymer.

The heated severing means concept of the present invention is useful in post trim thermoforming operations where it is desirable to create a thickened and rounded outer peripheral portion on a formed container in order to eliminate the annoying presence of sharp edges either in containers of the type for holding beverages where lip protection is important, or in shallow trays which are overwrapped with film for holding consumer food items where fracturing of the overwrap and abrading of fingers is sought to be avoided. The invention is especially useful with noncylindrical containers where edge rolling by rotating the container about a central axis is not possible, since the severing means can be designed to match the periphery of the formed container, regardless of its shape. By utilizing heated severing means, the tendency of the heat to melt the plastic and thereby aid in separating the container from the sheet is utilized, thus reducing the criticality of edge sharpness of the severing means.

It is obvious that many variations may be made in the invention set forth above without departing from the spirit and scope of the invention.

We claim:

1. In the method of forming thermoplastic containers having laterally extending flanges with thickened outer sections which includes the steps of inducing stresses in a sheet of thermoplastic material, heating a portion of the sheet from which each container will be formed to molding temperature without substantially destroying said stresses, forcing each heated sheet portion against a mold surface to form one of said flanged containers attached to said sheet at the periphery of said flange, cooling each flanged container to set the thermoplastic, separating each flanged container from the remainder of the sheet and heating the outer edge portion of the flange of each container to relieve stresses therein, the improvement which comprises stretching a generally continuous flexible, polystyrene, sheet in two directions to between 50 to 300 percent of its initial dimensions to produce a highly stressed sheet having a thickness of between 5 to 30 mils, forcing successive portions of said polystyrene sheet against a heating platen under the influence of air at a pressure of from 40 to 60 p.s.i.g. such that the combination of the force generated by the air and the frictional force between the surface of the platen and the sheet portions are greater than the stress forces previously induced in the polystyrene sheet, simultaneously forming plural numbers of said flanged containers from said successive portions of said generally continuous polystyrene sheet by drawing said sheet portions into mold cavities and expanding them outwardly against the surfaces of said cavities solely by means of fluid pressure, conveying said successive sheet portions with said containers attached therein away from the place of forming to a downstream trimming station after said cooling, forcing a cutting element at a temperature of between 300° to 350° F. into said flexible sheet around the periphery of the flange of each container toward an opposing unheated, sheet supporting die to separate said plural containers from each successive portion of the flexible thermoplastic sheet simultaneously with said stress relieving, thereby forming a solid, thickened outer section of said flange free of jagged edges.

* * * * *

PO-1050
(5/69)

UNITED STATES PATENT OFFICE
CERTIFICATE OF CORRECTION

Patent No. 3,619,444        Dated November 9, 1971

Inventor(s) John K. Roth

It is certified that error appears in the above-identified patent and that said Letters Patent are hereby corrected as shown below:

Col. 1, after the title, insert - - -

This invention relates to a method for forming containers from thermoplastic sheet material.

The use of thermoformed plastic trays to transport items is well known. In recent years, trays, such as that disclosed in U.S. No. 3,403,834 are being increasingly fabricated of transparent thermoplastic and overwrapped with clear film to permit viewing of all sides of the contents by the purchaser. A problem inhibiting even more widespread acceptance of these packages has been the presence of jagged edges left on the outer periphery of the container as a result of the forming process. These jagged edges abrade the fingers of personnel during assembly of the packages and often rupture the film overwrap and destroy the package seal.

Prior art approaches to eliminating this problem have involved treating the containers, such as by flame or grinding, to smooth the jagged edges thereof. These approaches, though satisfactory, involve treating already present edges as opposed to eliminating their formation.

The present invention utilizes the concept of selectively heating peripheral portions of a container of initially oriented material, while separating it from the thermoplastic web from which it was formed, in order to stress relieve and thereby thicken an edge portion of the container. - - -.

Col. 6, line 6, before "claim" delete "We" and insert - - - I - - -.

Signed and sealed this 16th day of May 1972.

(SEAL)
Attest:

EDWARD M. FLETCHER, JR.
Attesting Officer

ROBERT GOTTSCHALK
Commissioner of Patents